US012596977B2

(12) United States Patent
Kurt et al.

(10) Patent No.: US 12,596,977 B2
(45) Date of Patent: Apr. 7, 2026

(54) SHARED DATA INDUCED PRODUCTION PROCESS IMPROVEMENT

(71) Applicant: Versum Materials US, LLC, Tempe, AZ (US)

(72) Inventors: Safa Kutup Kurt, Darmstadt (DE); Rolf Roth, Darmstadt (DE); Laura Matz, Tempe, AZ (US); Samuel Wood, Tempe, AZ (US)

(73) Assignee: Versum Materials US, LLC, Tempe, AZ (US)

( * ) Notice: Subject to any disclaimer, the term of this patent is extended or adjusted under 35 U.S.C. 154(b) by 193 days.

(21) Appl. No.: 18/282,617

(22) PCT Filed: Mar. 17, 2022

(86) PCT No.: PCT/EP2022/056953
§ 371 (c)(1),
(2) Date: Sep. 18, 2023

(87) PCT Pub. No.: WO2022/195001
PCT Pub. Date: Sep. 22, 2022

(65) Prior Publication Data
US 2024/0177093 A1      May 30, 2024

Related U.S. Application Data

(60) Provisional application No. 63/163,460, filed on Mar. 19, 2021.

(51) Int. Cl.
*G06Q 10/0633* (2023.01)
*G06Q 10/0637* (2023.01)
(Continued)

(52) U.S. Cl.
CPC ... *G06Q 10/0633* (2013.01); *G06Q 10/06375* (2013.01); *G06Q 10/06395* (2013.01); *G06Q 50/04* (2013.01)

(58) Field of Classification Search
CPC .......................................... G06Q 10/00–50/00
(Continued)

(56) References Cited

U.S. PATENT DOCUMENTS 6,675,135 B1 * 1/2004 Murray .................. G06F 30/00
700/109
6,901,372 B1 * 5/2005 Helzerman ........ G06Q 10/0633
705/7.41

(Continued)

FOREIGN PATENT DOCUMENTS

JP        2019-148999 A    9/2019
TW          201734955 A   10/2017
WO       2020/058237 A2    3/2020

OTHER PUBLICATIONS

International Search Report and Written Opinion received for PCT Patent Application No. PCT/EP2022/056953, mailed on Jun. 21, 2022, 12 pages.
(Continued)

*Primary Examiner* — Alan S Miller
(74) *Attorney, Agent, or Firm* — Faegre Drinker Biddle & Reath LLP

(57) ABSTRACT

A method for developing or improving a process for producing a product from a material comprising steps of acquiring process data from at least two different sources for the production process and its relevant parameters by using a Data Collecting computer; using the acquired process data related to the production process to perform a Process Mapping step by using a Process Mapping computer; assigning the acquired process data related to the relevant parameters of the production process to its corresponding process parts by performing a Data Mapping step by using a Data Mapping computer; analyzing the therefore mapped process data with a specific software performed on an Analyzing computer thereby identifying and validating one or more
(Continued)

Figure 1:
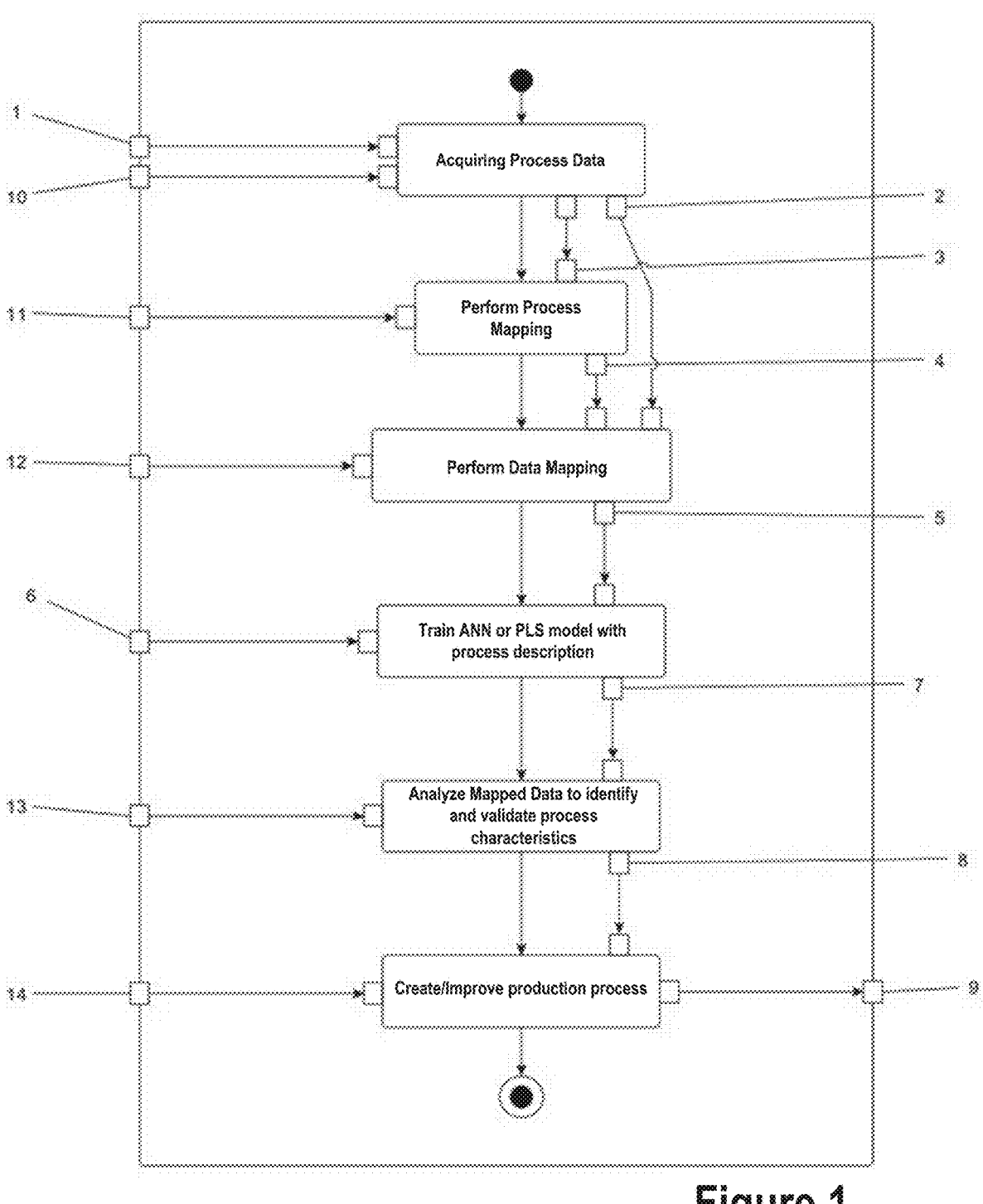

existing characteristics related to the quality or performance of the production process; and using the identified and validated characteristics to develop the production process or improve its performance.

18 Claims, 6 Drawing Sheets

(51) Int. Cl.
  *G06Q 10/0639* (2023.01)
  *G06Q 50/04* (2012.01)
(58) Field of Classification Search
  USPC ................................................ 705/7.11–7.42
  See application file for complete search history.

(56) References Cited

U.S. PATENT DOCUMENTS

| | | | | |
|---|---|---|---|---|
| 7,882,438 | B2 * | 2/2011 | Markham | .............. G06Q 10/10 |
| | | | | 700/109 |
| 8,705,839 | B2 * | 4/2014 | Zhang | .................. G06T 7/0008 |
| | | | | 382/144 |
| 8,756,230 | B2 * | 6/2014 | McCleary | ............ G06V 10/987 |
| | | | | 700/110 |
| 10,430,719 | B2 * | 10/2019 | David | ..................... G03F 7/705 |
| 11,080,127 | B1 * | 8/2021 | Vincent | ................ G06F 11/079 |
| 2003/0150909 | A1 * | 8/2003 | Markham | .............. G06Q 10/06 |
| | | | | 235/376 |
| 2006/0229921 | A1 * | 10/2006 | Colbeck | ........... G06Q 10/06375 |
| | | | | 705/7.29 |
| 2009/0144134 | A1 * | 6/2009 | Henby | ............. G06Q 10/06313 |
| | | | | 705/7.41 |
| 2010/0138026 | A1 * | 6/2010 | Kaushal | ................... G06N 5/04 |
| | | | | 706/23 |
| 2017/0200265 | A1 * | 7/2017 | Bhaskar | ............... G06T 7/0004 |
| 2019/0188192 | A1 * | 6/2019 | Hayes | ................... G01D 9/005 |
| 2019/0277913 | A1 * | 9/2019 | Honda | ................. G06N 3/0499 |
| 2020/0026710 | A1 * | 1/2020 | Przada | ................... G06N 20/00 |
| 2021/0287177 | A1 * | 9/2021 | Musialek | ......... G06Q 10/06312 |
| 2021/0374940 | A1 * | 12/2021 | Liu | ..................... G06F 18/2193 |
| 2022/0067622 | A1 * | 3/2022 | Devarakonda | .......... G07C 3/08 |
| 2022/0180295 | A1 * | 6/2022 | Sahay | ..................... G06F 30/20 |
| 2022/0245402 | A1 * | 8/2022 | Tae | ......................... B29C 45/76 |
| 2022/0342379 | A1 * | 10/2022 | Orhanen | ................ G06N 3/044 |
| 2023/0162344 | A1 * | 5/2023 | Zhao | ..................... G06T 7/0004 |
| | | | | 382/141 |
| 2024/0061403 | A1 * | 2/2024 | Winkler | .......... G05B 19/41875 |
| 2024/0168467 | A1 * | 5/2024 | Kotriwala | ........ G05B 19/41875 |

OTHER PUBLICATIONS

Lee et al., "Recurrent feature-incorporated convolutional neural network for virtual metrology of the chemical mechanical planarization process," Journal of Intelligent Manufacturing, vol. 31, No. 1, Jul. 17, 2018, pp. 73-86.

\* cited by examiner

SHARED DATA INDUCED PRODUCTION PROCESS IMPROVEMENT

CROSS-REFERENCE TO RELATED APPLICATIONS

This application is a National Stage Entry application of PCT Application No. PCT/EP2022/056953, filed on Mar. 17, 2022, which claims the priority benefit of U.S. Provisional Patent Application No. 63/163,460, filed on Mar. 19, 2021. Each of the above documents is incorporated herein by reference in its entirety.

TECHNICAL FIELD

The disclosed subject matter relates to a method and a system for developing or improving a process for producing a product from a material. The disclosed subject matter belongs to the technical field of an automated production management.

BACKGROUND

Production processes in modern production sites are very complex matters which are dependent on many parameters and variables regarding the involved materials, used production machines, responsible workers and so on. Even the slightest maladjustment of one of those variables can lead to significant quality issues for the fabricated products, making them inferior or even unsalable. Especially in critical sectors like chemical or pharmaceutics this can lead to inacceptable deficiencies for the producer. To improve the production process and ensure the quality of the fabricated products there are many ways known in the state of the art to supervise the whole process. Most of them are nowadays data-driven where the relevant parameters and variables of the production process are monitored and checked regularly if they derive from their set target values.

One of those approaches is the Six Sigma method which, in the control phase, concentrates on plotting parameters, like length, which measure a specific characteristic of a product being manufactured against frequency of production and by comparing the distribution, like the range and frequency of lengths, to an optimum design point, like a specified length, and upper and lower limits to identify defective products. The result is usually a Gaussian distribution having a mean about the optimum parameter design point with some portion of production outside the limits. The term "sigma" is synonymous with a standard deviation. One measure of product quality is the number of sigmas or standard deviations about the distribution mean which fit within specified limits.

From the U.S. Pat. No. 7,181,353 B2 a method for integrating Six Sigma into an inspection receiving process of outsourced products is known and includes the following steps: defining specification limits for product acceptance criteria; identifying and reporting a substandard product to authorized personnel for disposition via a MES (manufacturing execution system) and SCADA (supervisory control and data acquisition); preparing a report containing historical data, identifying root cause and assigning a corrective action; segregating the substandard product, and documenting the substandard product in the MES; disposing the substandard product; documenting and recording the corrective action in the MES; and outlining a method of recovery and eliminating a non-conforming incoming product. The present method may provide a device for a Closed Loop Corrective Action (CLCA).

The U.S. Pat. No. 6,675,135 B1 discloses a method to be used during a product development procedure wherein the procedure includes a series of consecutive development phases and the product includes at least two critical to quality characteristics (CTQs). The method is for generating a confidence matrix which can be used to increase a product sigma through product design. A user initially provides product limits and thereafter provides additional development information during each consecutive development phase. During at least two of the development phases and for each CTQ, development information is used to determine a quality factor which is indicative of the probability that the product will be within the specified limits. Also, for each CTQ, a confidence factor is identified which is indicative of the probability that the quality factor is accurate. Then, quality factors, CTQs and confidence factors are arranged such that the CTQs and factors are correlated.

Those known methods cling very tight to the Six Sigma approach, concentrating on specific steps of that method to ensure set quality standards and are therefore less suitable to be used in alternative approaches which differ from that method. Furthermore Six Sigma is a process improvement method that relies on the "voice of the customer" and prioritization and filtering via expert input. It usually does not include modern data driven approaches with Machine Learning tools. Therefore it has deficiencies when being used with those automatized methods, e.g. to double check human expert analyzes. Some have also stated that the Six Sigma standard does not go far enough to really guarantee defect free products. Also, the proposed approach is not limited to predefined scope items. In the definition phase of the Six Sigma process, items for scope-in and scope-out are clearly defined by the experts who are involved in the project team. Here, physics-first approach is used to narrow down to suspicious areas which may relate with the voice of customer. The out of scope items may or may not be investigated in with further projects. Thus, even though the issue can be solved within the project frame in the Six Sigma approach, there is no systematic way or method to consider the out of scope items. This might hinder the discover of the underlying root-cause of the issue in long-term. A sustainable problem-solving for upcoming deviations may not be provided.

Another point is that in the case of different productions sites with different production processes and philosophies, e.g. like a material provider and an actual producer, the six sigma approach leads to or better requires aligning and/or merging those two different production processes. This can be difficult and causing a lot of effort dependent on how different the processes are.

Therefore it would be desirable to find a new approach to operate automatic production management systems which further enhances the production process regarding quality and reliability and which can handle different processes efficiently.

SUMMARY

This task can be solved by a method for developing or improving a process for producing a product from a material comprising the following steps of acquiring process data from at least two different sources for the production process and its relevant parameters by using a Data Collecting computer, using the acquired process data related to the production process to perform a Process Mapping step by using a Process Mapping computer, assigning the acquired process data related to the relevant parameters of the production process to its corresponding process parts by performing a Data Mapping step by using a Data Mapping computer, analyzing the therefore mapped process data with a specific software performed on an Analyzing computer thereby identifying and validating one or more existing characteristics related to the quality of the production process, and using the identified and validated characteristics to develop the production process or improve its performance. Core of the present disclosure is to first track all the possibly relevant data related to the desired production process, which shall be created or improved. This data is collected from at least two different sources, like different production sites and contain e.g. internal process data and customer data. The different sources can of course also be located in the same production site and originate e.g. in two different production machines. Therefore the data can be different regarding to structure, format, syntax etc. In the process mapping step the available data relating to the desired process is then used to establish and define process structures like the specific process method steps and the required process components. It also includes the mapping of the data from the first and the other sources so both different data types can be processed. Point is here to don't simply align the data from the different sources to create on single process but to keep it separately and map it together so it can be processed and analyzed later on. The available process data can describe for instance an already existing production process which is supposed to be improved by the disclosed method. Or it could contain data describing a wanted new production process, like available production machines, raw material and the like, for creating the new production process to be most efficient. In a data mapping step process data relating to the process parameters like specific temperatures, specific used materials and so on is then assigned or mapped to its process counterparts to which these parameters are related to from the created process in the process mapping step. The two method steps of process and data mapping can be performed simultaneously or the data mapping step can be executed after the process mapping step. After the process is successfully defined including its process parameters assigned the actual process evaluation takes place in the analyzing step. During that evaluation a special software is fed with the mapped process data and analyzes it's content searching for specific patterns and dependencies which disclose characteristics of a process which can be used to improve the established process. The software can use different kinds of algorithms. It could use for instance an artificial intelligence approach like supervised, unsupervised, semi-supervised and reinforcement learning etc. Which one is most suitable depends on the kind of available process data. Important is that the algorithm gets trained to find patterns or identify influencing factors of the process. The approach can be implemented by using Gradient Boosted Decision Trees, artificial neural networks (ANN) or other. This ANN could then further improve its performance by learning on its fed, mapped process data. But also other AI software approaches are possible. The software could alternatively also use approaches from classical statistics, if they are suitable to determine the characteristics. Which approach is then most suitable and therefore chosen depends on the specific case and the respective kind of process data. After the mapped and analyzed process is created and the characteristics are identified those characteristics are applied to the process, therefore improving it. Those characteristics can be used additionally to insights gained from process experts to improve the process. The better the software is able to determine the characteristics the less expertise from human experts is necessary. All those method steps are performed by computers which are configured to perform the method steps. While complete automation of the method steps is desired which depends on the abilities of the used hardware and software, human support, for instance in evaluating the acquired data or the identified characteristics, might be necessary. The minimum requirement for the involved computers includes their ability to process, transfer and display the acquired process data and to perform the software analyzing step. The computers itself can be different computers at different locations which are connected to each other via internet, local networks etc. or some or all of them can be identical.

In this new approach the scope is not predefined by experts based on their strong technical knowledge. Data-first approach is used to define the areas of variations, which should be investigated further with subject matter experts. As an example, a typical quality variation at the customer side can be investigated within this approach by analyzing the customer data at the beginning. Then, the customer data is used to find our correlations with input parameters in every step of the manufacturing process. Once the source of variations for customer performance are determined by using advanced analytics techniques, their scientific justification is done by process development, R&D, quality or manufacturing experts. The most correlated parameters from the manufacturing are further analyzed for some selected samples to validate the source of variation for customer performance. As a result of a positive validation with data-based methods, like predictive data models, further validation is done by producing a new batch of material according to the outputs of predictive model. This material is then tested by the customer and measured performance parameter is compared with predicted value by the model.

The scope of our approach is not limited to this. In long-term, the learnings from a use-case is cascaded down to R&D for product development and also cascaded back to procurement (to suppliers). In the light of these leanings, experts aim to control the purchasing of the best material from our supplier, while investigating the specification of the next generation material for our customer's new application technology in R&D.

In a nutshell, our approach aims to utilize the intersection point of supply chain and asset lifecycle, i.e., production to understand the need of our customer with data-driven hypotheses. Afterwards, we decompose the outcomes from the use case that is conducted in production with respect to corresponding development areas within the parts of supply chain and asset life cycle.

Advantageous and therefore preferred further developments of the present disclosure emerge from the associated sub claims and from the description and the associated drawings.

One of those preferred further developments of the disclosed method comprise that for acquiring the data for the production process and its relevant parameters the process data is retrieved from a database which is connected to the Data Collecting computer, created by observing the process using data collecting devices, notably sensors, and/or provided by a human user. Which of these approaches in which combination depends on the target production process. Usually the process data is of a better quality if at least some current data from sensors is involved.

Another one of those preferred further developments of the disclosed method comprise that acquiring the data by observing the production process is done during previous executions of the process and/or during a current execution after using the identified and validated characteristics. By doing that, it is ensured that the acquired data is always up-to-date. It also greatly improves the efficiency of using AI methods like ANNs if they are trained and used with up-to-date information.

Another one of those preferred further developments of the disclosed method comprise that the Process Mapping is performed by describing the structure of the production process or its pre-stages from the different sources including necessary components, process sequences or process steps, ingredients, like raw material and the like. By doing so the process is defined and can afterwards be analyzed by the software to create or improve its performance.

Another one of those preferred further developments of the disclosed method comprise that the Data Mapping is performed by assigning the acquired process parameter from all involved sites, like temperature, mixing ratio of raw materials, time, and the like, to its corresponding process components and process sequences or steps. While the process mapping defines the process structure, its necessary components and the like the data mapping assigns its parameters to their relevant process components which are defined in the process mapping. The therefore prepared process data is then ready to be analyzed by the software performance relevant characteristics.

Another one of those preferred further developments of the disclosed method comprise that analyzing the data is performed by the software using supervised and unsupervised algorithms including a data analysis framework with a data model using approaches like Multivariate Analysis like PLS regression, PCA, Random Forest, XGBoost, and artificial Neural Networks, PLS regression and/or Random Forest or the like, or using supervised and/or unsupervised static algorithms. Both kinds of algorithms—supervised and AI related or not—can be used by the software. But the more complex the process in question is, the more difficult it becomes to provide a software with a non-learning approach which really identifies all the wanted process characteristics. Those are more suitable for but of course not limited to less complex production processes or if only specific defined process parts need to be evaluated.

Another one of those preferred further developments of the disclosed method comprise that an XGBoost, Random Forest or artificial neural network is used as supervised algorithms, which structure is the result of training the artificial neural network with the results of the process data from the Process and Data Mapping. Artificial Neural Network (ANN) or the like are very suitable to evaluate those complex production processes because they cannot only be trained with the mapped data from the process and data mapping steps and therefore be adapted to the production process no matter how complex it gets. They can also be used in several re-iterations of the disclosed method getting better and better adapted the more often they are used to identify the process characteristics.

Another one of those preferred further developments of the disclosed method comprise that the process data is acquired by examining the at least two different sources either manually by a user who inputs this data in the Data Collecting computer or automatically by a Data Collecting Software performed on either the Data Collecting computer or a separate computer which is connected to it with the Data Collecting Software transmitting it to the Data Collecting computer. Which one of those approaches is used, depends on the restrictions and abilities of the used hardware and software. The more data acquiring can be done automatically the better.

Another one of those preferred further developments of the disclosed method comprise that as at least two different sources at least two different production sites are used. Those different sites could be for instance one site producing the raw material for the products which is supervised by a material provider while the other site is the actual production plant.

Another one of those preferred further developments of the disclosed method comprise that the characteristics are root causes, like maintenance problems, or previously unknown process issues related to the performance or quality of the process, like specific setting parameters for the production process. Root causes are mainly relevant when the present disclosure is used to improve existing production processes, especially to solve a specific problem with it. But the present disclosure can also be used to create new production processes by identifying so far unknown connections between process parameters and/or components and by therefore solving issues or open up new potentials which have not been thought about before.

Another one of those preferred further developments of the disclosed method comprise that a new production process is created or an existing production process is improved by a user and/or a Process Performing computer setting up the new production process by using the identified characteristics or improving the existing production process by adapting it considering the identified characteristics. As previously explained the disclosed method enables both options. When improving an existing process the identified characteristics, meaning root cases, can be fixed by either an user or automatically by a computer therefore improving the process—for instance when it is about adapting some machine settings. If a new process shall be created the newly discovered and promising connection needs to be integrated in the production process steps therefore creating the new process.

Another one of those preferred further developments of the disclosed method comprise that the production data from the at least two involved production sites comprises raw material data like specific quality parameters or metal impurity and purity levels, P&ID charts, or in-process-data like sensor data including temperatures, flows, tank levels etc. That data can be generally assigned to two different categories. One is the process related data, like the P&ID charts etc., which is necessary for performing the process mapping thus defining the process. The other category comprise of the process parameters, like sensor data and so on, which feeds the data mapping step.

A further component of the present disclosure is a system for developing or improving a process for producing a product from a material comprising a Data Collecting computer with a connected database and/or at least two production sites being used to acquire process data from the at least two production sites for the production process and its relevant parameters, a Process Mapping computer being used to perform a Process Mapping step with the acquired process data related to the production process, a Data Mapping computer being used to assign the acquired process data related to the relevant parameters of the production process to its corresponding process parts by performing a Data Mapping step, an Analyzing computer including a specific software performed on it using a supervised algorithms including a data analysis framework with a data model wherein the software analyzes the therefore mapped process data to identify and validate one or more existing characteristics related to the quality or performance of the production process and a Process Performing computer being used to create the production process and/or improve its performance on the at least two production sites by applying the identified and validated characteristics. That system performs the disclosed method. As already explained the mentioned computers in the system can be established as separate system components or be the same computer or a combination thereof whatever suits best. At least the Analyzing computer with the specific software should preferably be a separate computer. If the data from the at least two different production sites is acquired automatically then the Data Collecting computer needs to be connected with a kind of an automatic control that is computer-based in each of the production sites. The types of the used computers depends on the requirements of the performed method. If most of the method steps are performed by human users a kind of personal computer, tablet, mobile phone or the like with a display and some data input means or interfaces so the users can provide the data to the computers and the used software should be used. The more automated the method is performed also other types of computers like industrial pcs, microcontrollers, single-board or embedded computers in general can be used. A clear defined data interface and data transfer network, like ethernet, bus-systems or wireless alternatives, for automatic data transmissions gets then more important.

One preferred further developments of the disclosed system comprise that at least one of at least two sites is a factory for producing chemicals, pharmaceuticals or the like and at least one of the other sites is a chemical material provider and/or distributor. In this case both sites need to be connected to the Data Collecting computer and/or its respective database to provide the necessary process data if there is an automatic data transfer required. If, due to the different site owners only secured, non-automated data transfer is possible, the connection is more indirect e.g. by transferring secure data storages and the like.

Another one of those preferred further developments of the disclosed system comprise that the Data Collecting computer is hosting a computer based digital platform which is used to acquire the process data from the at least two production sites. Another possibility of acquiring the necessary process data lies in using a digital platform for the data acquiring to which all participating production sites can transfer their process relevant data. The platform will then manage this data and distribute it to the respective Process and/or Mapping computer to perform their Mapping steps.

Another one of those preferred further developments of the disclosed system comprise that the Process Mapping computer and the Data Mapping computer are supporting input terminals for human users to perform the Process Mapping and Data Mapping step, while the Analyzing computer is a server which hosts the software with the supervised and/or unsupervised algorithm, notably a XGBoost, Random Forest or artificial neural network, and the Process Performing computer is part of or identical to the respective computer based control terminal for the at least two production sites. Like already mentioned if human users are required to perform part of the method steps the used computers must provide respective in- and output means, like keyboards, mouse, screens, and the like, and respective software to process this input. If an ANN is used by the software a suitable computer hardware for this ANN is required.

A further component of the present disclosure is an XGBoost, Random Forest or artificial neural network, or other AI approach which structure is dependent on being trained with specific training data which is created acquiring process data from at least two different sources for a production process and its relevant parameters via a Data Collecting computer, using the acquired process data related to the production process to perform a Process Mapping step via a Process Mapping computer, assigning the acquired process data related to the relevant parameters of the production process to its corresponding process parts by performing a Data Mapping step via a Data Mapping computer and creating training data from those mapped process data. The therefore created training data is then used to train the software and establish its necessary internal structure so it can be used to analyze the mapped process data to identify the required process characteristics. By providing the software with the real process data it is further trained and improves its analyzing performance.

Another component of the present disclosure is a Computer program comprising instructions which cause the involved computers to carry out the method steps of acquiring process data from at least two different sources for the production process and its relevant parameters via a Data Collecting computer, using the acquired process data related to the production process to perform a Process Mapping step via a Process Mapping computer, assigning the acquired process data related to the relevant parameters of the production process to its corresponding process parts by performing a Data Mapping step via a Data Mapping computer, analyzing the therefore mapped process data with a specific software performed on an Analyzing computer thereby identifying and validating one or more existing characteristics related to the quality of the production process, and using the identified and validated characteristics to create the production process and/or improve its performance via a Process Performing computer. The program parts responsible for the single method steps are running on the respective computer parts. How the program itself is partitioned depends on the computer hardware being involved. It is possible to use a main software running on one of the mentioned computers or a separate computer which controls local client programs. Other options include equal instances of the software who communicate with each other and so on.

Only requirement for this computer program to perform the whole method as described is, that the used program and its respective hardware components are able to perform the method completely and automatically. Such a program can then be stored on a Computer-readable storage medium and/or data carrier signal which cause the involved computers to carry out the method steps of acquiring process data from at least two different sources for the production process and its relevant parameters via a Data Collecting computer, using the acquired process data related to the production process to perform a Process Mapping step via a Process Mapping computer, assigning the acquired process data related to the relevant parameters of the production process to its corresponding process parts by performing a Data Mapping step via a Data Mapping computer, analyzing the therefore mapped process data with a specific software performed on an Analyzing computer thereby identifying and validating one or more existing characteristics related to the quality of the production process and using the identified and validated characteristics to create the production process and/or improve its performance via a Process Performing computer. The storage medium can be stored on any suitable digital memory like a USB drive, a hard disk, a flash drive and so on. From that memory it can also be provided via remote communication means using respective data carrier signals, like ethernet, wired or wireless, or any other suitable network transmission means, for transmitting the software to its target hardware.

BRIEF DESCRIPTION OF THE DRAWINGS/FIGURES

Figure 2:
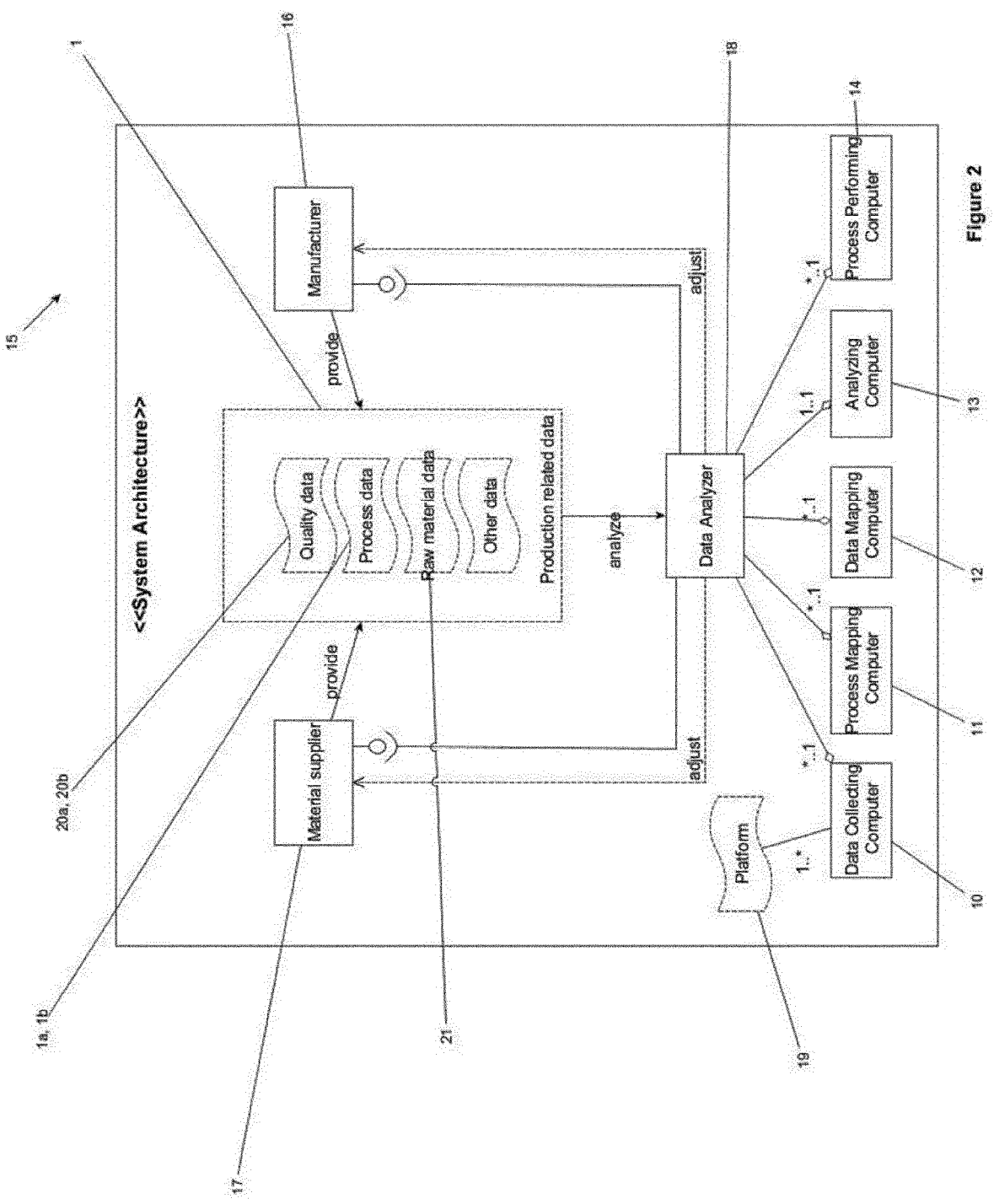
Figure 3:
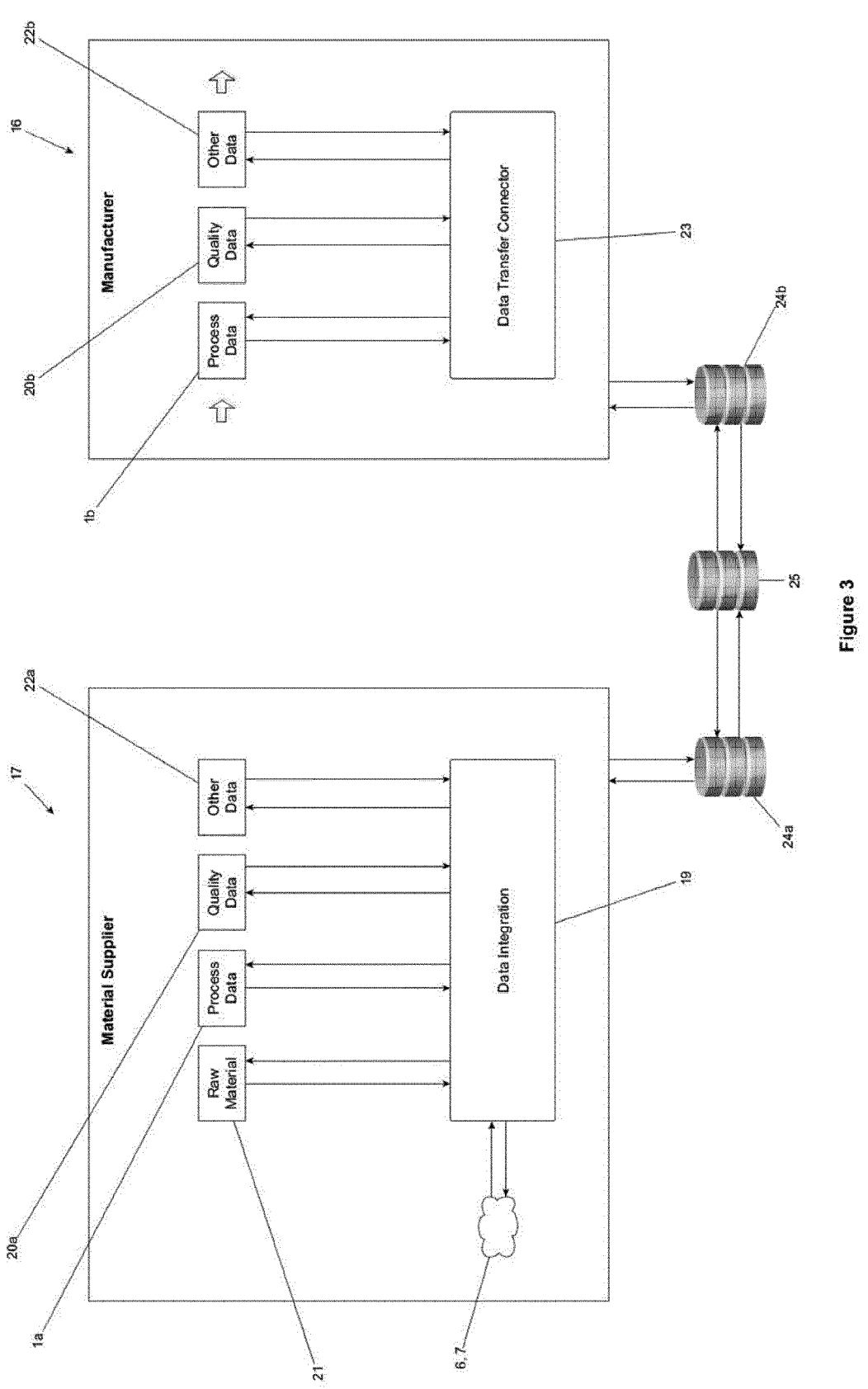
Figure 4:
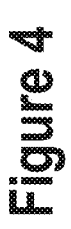
Figure 5:
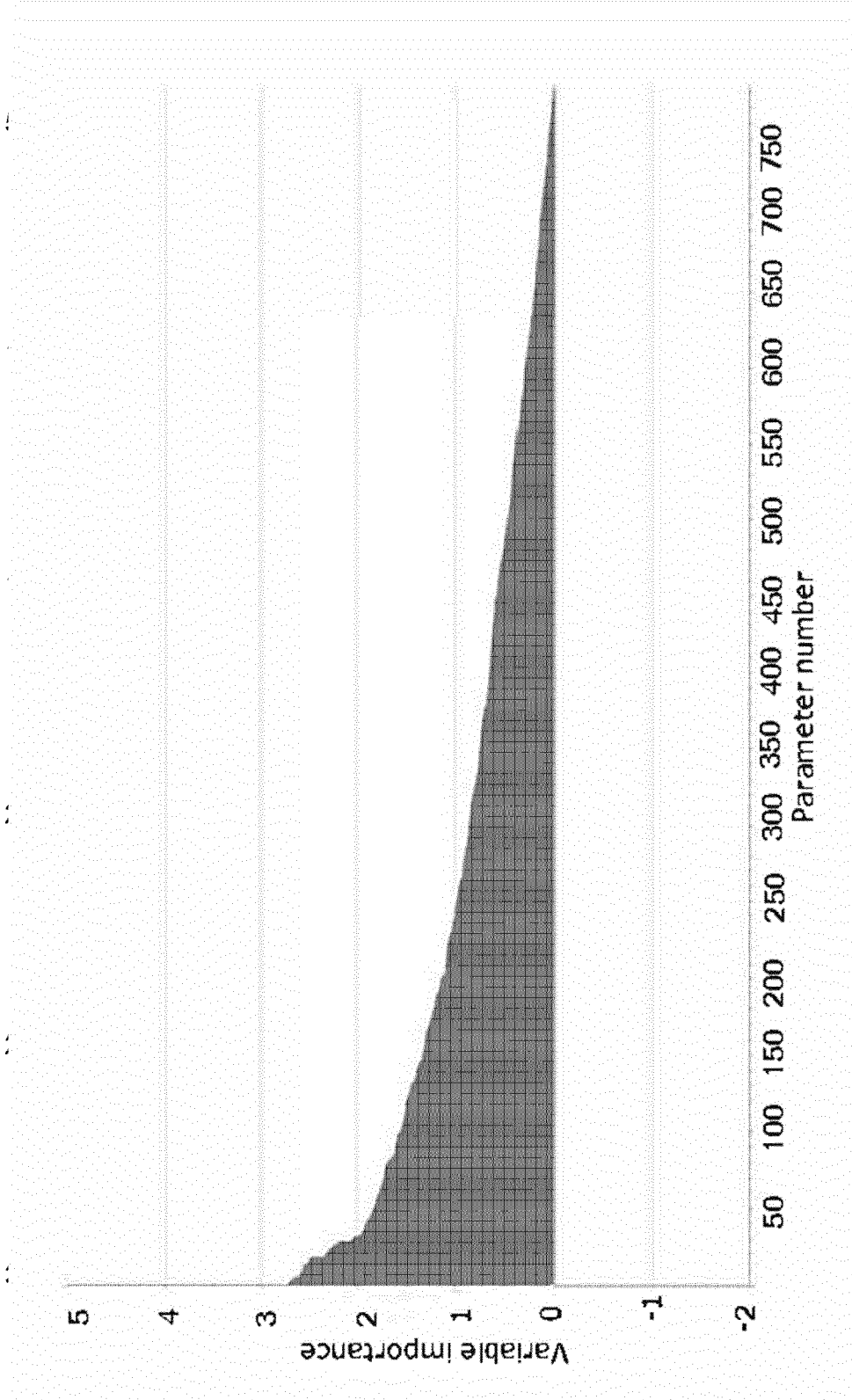
Figure 6:

The system, method and software product according to the disclosure and functionally advantageous developments of those are described in more detail below with reference to the associated drawings using two example embodiments. In the drawings, elements that correspond to one another are provided with the same reference numerals.
The Drawings Show
FIG. 1: a general overview about the necessary method steps.
FIG. 2: an schematic overview about the involved system components.
FIG. 3: an schematic overview about two production sites and the process data types they provide.
FIG. 4: the results of a Multivariate Analysis from good and bad batches including a reduction of parameters.
FIG. 5: the most significant parameters for "good" and "bad"-batch discrimination.
FIG. 6: Identified root cause of aging effects (fouling) due to a change in cleaning procedure.

DETAILED DESCRIPTION

The present disclosure will be explained in more detail by presenting two example embodiments. A first one shows how an existing production process is improved, while the second exemplary embodiment concentrates on creating a whole new production process to establish a new product line.

FIG. 1 shows an overview about the necessary method steps in both embodiments. The steps itself are performed divergent in every exemplary embodiment dependent on the different conditions. The data analysis system 15 which performs the method is shown in FIG. 2. As previously explained its structure can also differ from embodiment to embodiment. Especially the kind of involved computers can differ greatly, depending on how much of the steps is performed by human users with the help of computers and application software or done automatically by specific computers using for instance AI software.

FIG. 3 discloses an schematic overview about two example production sites and the process data types they provide. In this case it is a Material Supplier Site 17 and a Manufacturer Site 16 wherein the Material Supplier Site 16 provides data about raw material 21, process related data 1*a*, quality data 20*a* from the Material Supplier, other data 22*a* and so on. This data is collected by the Data Collecting Computer 10 which performs a Data Integration 19 and provides the data then to the used Data Model 6, 7, like an PLS Model or an artificial neural network. The Manufacturer Site 16 provides data about its own production process 1*b*, its own quality data 20*b*, other data 22*b* etc. This data is then transferred via a Secure Data Transfer Connector 23. The communication of the data between the two sites 16, 17 is performed by web services 24*a*, 24*b* which are assigned to the sites. Additionally or alternatively also third party web services 25 can be used. This could be e.g. centrally managed by a Digital Data Platform.

First Example Embodiment

The first example embodiment shows now how an existing production process is improved by solving a defectivity issue in the production process of a SOD product in the thin film field of technology.

In this example an involved production plant 16 was required to increase the production capacity. Shortly after doing so high failure rates in the manufacturing process were reported. Standard univariate data analysis methods were insufficient to resolve the issue because of the highly complex data set of 1000 parameters/variables and more therefore leading to applying the disclosed method using the following method steps as disclosed in FIG. 1 to solve the issue.

In the first step available production related data 1 was acquired, cleaned and integrated by local experts. A manufacturing engineering team aggregated the previously performed process, involved raw material 21 and available quality control data. The data 1 included: Process data, like sensor data, temperatures, pressures, tank levels, and so on, from the process control system of the production plant 16, raw material data 21 from the suppliers 17, additional internal raw material 21 from quality measurements e.g. trace metal impurity levels and purity levels, from excel files. The batch context, like the product batch about was produced when, was obtained from the manufacturing engineering data base running on a local server and Excel Sheets. Defectivity Data, including the production plant 16 location, per batch was provided as well. All the acquired data was then stored in the memory of the involved Data Collecting computers 10.

In the Process Mapping step a process overview and explanations about the general process description 3 were provided by manufacturing engineers from the production plant 16. Several process charts 4 have already been available from previous projects. PI&D charts were collected and stored in the involved Process Mapping computers 11 as well. Additional a personal site visit to better understand the manufacturing process and improve the general process description data 3 was done in two days.

After that the Data Mapping step was performed. During this step all available data, especially the Separated Process parameters 2, was checked with subject matter experts and physical meaning behind the data was understood with chemical process engineering knowledge. Several process, quality and data experts mapped or rather connected the available data 2 to every related process step from the process mapping using the Data Mapping computers 12. An example is the temperature measurement TI5 from the process control system which corresponds to the upper temperature sensor in distillation. Key points regarding the data integration were for instance clarified by identifying the critical unit operations, which combines two upstream batches or splits a processed batch into two or more portions In this case the collected production related data 1 came from four different manufacturer sites 16. Sometimes, one finished good batch was used in different sites 16 resulting in different defectivity values. For those site-specific threshold values of defectivity were defined. In this case between 7 and 13 defect counts were the used threshold values depending on the site 16 location. The lowest threshold value 7 defect counts was used to ensure maximum safety for the upcoming data analysis. It means that any finished good batch that resulted in defect count less than 7 in any of the sites 16 was assigned as "good" batch for the internal optimization. Otherwise it was labelled as a "bad" batch.

That resulted in the finished process description with mapped process parameters 5.

With that finished process description 5 the Data Analytics step could be performed. All data was matched based on the process order of the finished good ID with corresponding internal batch IDs. Several data models, in this case PLS, Random Forest and others, were used with different ways to model the data to make predictions of the defectivity and "good" or "bad" batches. The data models were running on several analyzing computers 13. In some exceptionally preferred embodiments the data models were based on PLS models. Those untrained PLS models 6 needed to be trained with suitable training data to be able to analyze the available production related data 1 respectively the derived finished process description 5. The training data can be created by using the available production related data 1 and/or the derived finished process description 5, for instance by but not limited to adding specific known errors which the PLS models then has to find. Then trained PLS models 7 are used for the analysis. The most important influencing factors were additionally discussed with process and QA experts. By applying multivariate data analysis methods in the used data models and chemical engineering knowledge, the most significant number of process parameters 2 were narrowed down to 22 out of 1811. FIG. 4 shows the effect of that reduction. Twelve parameters 2 were related to raw materials 21 and 10 out of 22 were related to process parameters 2. They were clustered for corresponding unit operations regarding reaction and distillation in the process flow during the process mapping. Due to the random and uncontrolled combination of these parameters 2, some "good" and all "bad" batches resulted to be outside of the secure area. The discovered correlation culminates in the question: Why is the majority of "good" batches clustered in the secure area?

A process window was generated by using the 22 process parameters 2 to answer that question. The discussions with process experts were conducted to understand the abnormal drop in the process window over the time. Records for plant maintenance sequences and sensor calibration dates were checked. It was understood that the process window change, which was visible with the model developed by using 22 process parameters 2, was occurred due to skipping a regular maintenance activity for reactor and distillation units. These process units were the ones where the 22 process parameters 2 were assigned for. FIG. 6 shows those 22 most significant process parameters 2 for "good" and "bad" batch-discrimination which reveal a significant influence on the defect count measurements.

With that discovery, the maintenance activity could be identified as a possible root cause for the issue. Maintenance has been implemented to clean these unit operations due to fouling of material on the surface of the equipment. The fouling influences the performance of heat and mass transfer during the reaction and distillation. Thus, a kind of aging effect was visible for the respective sensor data in reaction and distillation, once the yearly cleaning process and replacement of distillation plates were stopped. As a result of this, fouling of the heat exchanger in the reaction unit, plates in the distillation unit and invasive sensors could be determined. By comparing the sensor measurements before and after regular maintenance this effect was acknowledged. The fouling was further proven by analyzing all sensor measurements of reaction and distillation unit via the multivariate data analysis using the mentioned predictive data models and validated by producing a new batch after maintenance. By doing so it was finally proven that the defect issue was caused by skipped maintenance.

Those results were then presented to production site owners 16. A corrective and preventive action plan to ensure that necessary maintenance will be performed was approved by them afterwards. Its implementation and subsequent review showed that the quality issue was successfully closed.

Second Example Embodiment

The disclosed method can also be used to create a whole new production process by identifying previously unknown problems in existing production processes allowing to establish a new product line. This is shown by the second example embodiment, which will be explained below.

The case here is about a production site 16 which needs to reach varying removal rates for a CMP slurry at this site 16. The removal rate of the fabricated product needs to be in a certain range.

In the Data acquisition step the available production related data 1 was acquired, cleaned and integrated into a so called data lake. This data lake is realized as a kind of digital data platform 19 running on suitable Data Collecting computers, in this case specific servers. The data includes the Process parameters 2 like sensor data, temperatures, flows, pressures etc. from the database of the production plant 16, again raw material data 21 from the CofAs (Certificate of Analysis, e.g. metals) from involved suppliers 17, additional internal raw material quality measurements like measure particle size and distribution of seed particles from excel files. The batch context, meaning which product batch was produced when, was obtained from OSISoft Historian and Excel Sheets. Performance Data including the day of use, the removal rate per blended batch was provided via excel files.

For the Process Mapping a process overview and explanations about the general process description 3 were given here as well. Several process charts 4 have also been available from previous projects. PI&D charts were collected and stored in the involved Process Mapping computers 11. The targets of the production were clarified.

For the Data Mapping step the available data, also here especially the Separated Process parameters 2, was mapped and connected to the respective process steps from the process mapping using involved Data Mapping computers 12. An example is here the process parameter of the temperature measured by an TI1234 and stored in a tag on the OSISoft historian database. It corresponds to the upper temperature sensor in Reactor 2 which is known from the process description 3 from the process mapping. Further questions regarding the data integration needed to be clarified. E.g. that the production site 16 uses a blend of 2 (sometimes 3) batches from the material provider 17. That leads to the question which data preprocessing should be used. The respective dataset from the production site 16 or the material provider 17.

The finished process description with mapped process parameters 5 is then analyzed. All of this data 5 was matched based on the batch ID. Several data models like PLS, XGBoost and others were used with different ways to model the data to make predictions of the removal rate. The data models were running on several analyzing computers 13. Some were based on artificial neural network (ANN) technology. Those untrained neural network embodiments 6 needed to be trained with the available production related data 1 respectively the derived finished process description 5 as previously described. The then trained ANNs 7 could be used for the analysis. The most important influencing factors were discussed with process and QA experts. Based on the input and different model results, the final models were obtained and tested on product batch data that was not available before to prove predictiveness of the model.

In the result known influencing factors were validated to have an impact. A further, previously not considered process parameter and it's time evolution, that could not be controlled easily, was additionally identified and shown to be important. Investments into plant automation were done to control this parameter better. Based on these results and former projects and their results, anew production process including a product line with more stable removal rate could be established.

LIST OF REFERENCES

1 Available production related data
1a Process data from Material Supplier Site
1b Process data from Manufacturer Site
2 Separated Process parameters
3 Separated general Process description
4 Created process charts with process steps
5 Finished process description with mapped process parameters
6 Untrained neural network or PLS model
7 Trained neural network or PLS models
8 Identified process characteristics
9 Created/improved production process
10 Data Collecting computer
11 Process Mapping computer
12 Data Mapping computer
13 Analyzing computer
14 Process Performing computer
15 Production system
16 Manufacturer Site
17 Material Supplier Site
18 Data Analyzer
19 Digital Data Platform
20a Quality data from Material Supplier
20b Quality data from Manufacturer Site
21 Raw material data
22a Other data from Material Supplier
22b Other data from Manufacturer Site
23 Secure Data Transfer Connector
24a Material Supplier Web Service
24b Manufacturer Site Web Service
25 3rd Party Web Service

The invention claimed is:

1. A method for improving a process for producing a product from a material comprising the following steps:

acquiring first process data from a first source of a plurality of sources for a production process of the product, second process data from a second source of the plurality of sources for the production process of the product, and parameters of the production process of the product, wherein the first process data comprises first defectivity data of the production process at the first source, the second process data comprises second defectivity data of the production process at the second source, and the production process comprises a process part;

retrieving, based at least on the acquired first process data and the acquired second process data, a description of the production process from the first source and the second source;

assigning the acquired first and second process data to respectively corresponding process part of the production process according to the parameters of the production process of the product;

identifying and validating, based on the acquired first and second process data, by a trained machine learning model previously trained by using the description and defectivity data of a produced product, a characteristic of performance quality of the production process, wherein the characteristic indicates a removal rate of defective products from output of the production process; and creating, based on the identified and validated characteristic, at least the respectively corresponding process part of the production process, thereby improving the performance quality of the production process.

2. The method of claim 1, wherein the acquiring the first process data further comprises retrieving the first process data from a database, and the database has been created by observing the production process using data collecting devices comprising sensors and through an interactive user interface.

3. The method of claim 2, wherein the acquiring the first process data further comprises observing the production process during previous executions of the production process and/or during a current execution of the production process after using the identified and validated characteristic of the performance quality of the production process.

4. The method of claim 1, wherein the retrieving the description of the production process further comprises describing a structure of the production process or its pre-stages including necessary components, a process sequence, ingredients, and/or raw material.

5. The method of claim 1, wherein the assigning the acquired first and second process data further comprises assigning the acquired parameters, like temperature, mixing ratio of raw material, time, and the like, to corresponding process components and process sequences.

6. The method of claim 1, wherein the identifying and validating further uses supervised algorithms including a data analysis framework with a data model using approaches, the approaches comprises Multivariate Analysis, and the Multivariate Analysis comprises PLS regression, PCA, Random Forest, XGBoost, and an artificial neural network, using supervised and/or unsupervised algorithms.

7. The method of claim 6, wherein the XGBoost, the PLS model, the Random Forest, and the artificial neural network are for use as the supervised algorithms, and a structure of the supervised algorithms based on a result of training the artificial neural network according to the retrieved description of the production process.

8. The method of claim 1, wherein the acquiring the first process data further comprises examining the first and second sources either manually by a user or automatically performed by a remote computer through communication over a network.

9. The method of claim 8, wherein the plurality of sources comprises at least two distinct production sites.

10. The method according to claim 9, wherein the first process data comprises raw material data like specific quality parameters or metal impurity and purity levels, in-process-data comprising temperatures, pressures, flows, and/or P&ID charts.

11. The method of claim 1, wherein the characteristics comprises a root cause, like maintenance problems, or previously unknown process issues related to the performance quality of the production process comprising specific setting parameters for the production process.

12. The method of claim 1, wherein a new production process is created or an existing production process is improved by a user by setting up the new production process by using the identified characteristic or improving the existing production process by adapting improvement according to the identified characteristic.

13. A System for developing or improving a process for producing a product from a material, the system comprises:
  a processor; and
  a memory storing computer-executable instructions that when executed by the processor cause the system to execute operations comprising:
  acquiring first process data from a first production site of a plurality of production sites for a production process of the product, second process data from a second production site of the plurality of production sites for the production process of the product, and parameters of the production process of the product,
    wherein the first process data comprises first defectivity data of the production process at the first production site, the second process data comprises second defectivity data of the production process at the second production site, and the production process comprises a process part;
  retrieving, based at least on the acquired first process data and the acquired second process data, a description of the production process from the first production site and the second production site;
  assigning the acquired first and second process data to respectively corresponding process part of the production process according to the parameters of the production process of the product;
  identifying and validating, based on the acquired first and second process data, according to supervised algorithms including a data analysis framework with a data model, characteristic of performance quality of the production process,
    wherein the characteristic indicates a removal rate of defective products from output of the production process; and
  creating, based the identified and validated characteristic, at least the respectively corresponding process part of the production process, thereby improving the performance quality of the production process.

14. The System according to claim 13, wherein the first production site of the plurality of production sites represents a factory for producing at least one of chemicals or pharmaceuticals, and the second production site of the plurality of production sites represents a chemical material provider and/or distributor.

15. The System according to claim 13, wherein the acquiring the first process data is performed at least in part by a computer based digital platform.

16. The System according to claim 13, wherein
  the retrieving the description of the production process is based at least in part on first interactive operations by a first operator,
  the assigning the acquired first and second process data is based at least in part on second interactive operations by a second operator,
  the identifying and validating the characteristic is performed by a server executing according to the supervised and/or unsupervised algorithms, notably an artificial neural network, and
  the creating the at least the respectively corresponding process part of the production process is performed at least in part by a computer based control terminal at a production site of the plurality of production sites.

17. A method, comprising:
creating training data for training at least one of XGBoost, Random Forest, or artificial neural network by performing operations comprising:
acquiring first process data from a first source of a plurality of sources for a production process of the product, second process data from a second source of the plurality of sources for the production process of the product, and parameters of the production process of the product,
  wherein the first process data comprises first defectivity data of the production process at the first source, the second process data comprises second defectivity data of the production process at the second source, and the production process comprises a process part;
retrieving, based at least on the acquired first process data and the acquired second process data, a description of the production process from the first source and the second source;
assigning the acquired first and second process data to respectively corresponding process part of the production process according to the parameters of the production process of the product; and
creating, based at least on the description and the production process and the assigned acquired first and second process data to the respectively corresponding process part, training data.

18. A computer-readable non-transitory recording medium storing a computer-executable program instructions that when executed by a processor cause a computer system to execute operations comprising:
acquiring first process data from a first source of a plurality of sources for a production process of the product, second process data from a second source of the plurality of sources for the production process of the product, and parameters of the production process of the product,
  wherein the first process data comprises first defectivity data of the production process at the first source, the second process data comprises second defectivity data of the production process at the second source, and the production process comprises a process part;
retrieving, based at least on the acquired first process data and the acquired second process data, a description of the production process from the first source and the second source;
assigning the acquired first and second process data to respectively corresponding process part of the production process according to the parameters of the production process of the product;
identifying and validating, based on the acquired first and second process data, by a trained machine learning model previously trained by using the description and defectivity data of a produced product, a characteristic performance quality of the production process, wherein the characteristic indicates a removal rate of defective products from output of the production process; and
creating, based on the identified and validated characteristic, at least the respectively corresponding process part of the production process, thereby improving the performance quality of the production process.

* * * * *